United States Patent [19]

Detrick

[11] Patent Number: 5,599,374
[45] Date of Patent: Feb. 4, 1997

[54] PROCESS FOR PRODUCING IMPROVED SULFUR-COATED UREA SLOW RELEASE FERTILIZERS

[75] Inventor: John H. Detrick, Birmingham, Ala.

[73] Assignee: RLC Technologies, L.L.C., Sylacauga, Ala.

[21] Appl. No.: 311,672

[22] Filed: Sep. 23, 1994

[51] Int. Cl.⁶ .................. C05C 9/00; C05G 3/10
[52] U.S. Cl. ............... 71/28; 71/64.07; 71/64.11; 71/64.13
[58] Field of Search .......... 71/28, 64.07, 64.11, 71/64.13, 904

[56] References Cited

U.S. PATENT DOCUMENTS 5,219,465  6/1993  Goertz et al. .................. 71/28

FOREIGN PATENT DOCUMENTS 4127459  2/1993  Germany .................. 71/64.07

Primary Examiner—Ferris Lander
Attorney, Agent, or Firm—Breiner & Breiner

[57] ABSTRACT

The present invention describes a sulfur-coated urea slow release granular fertilizer having a uniform, durable polymeric coating over the sulfur-coating. The polymer coating is formed by the direct in situ co-polymerization of diethylene glycol-triethanolamine polyol and a diisocyanate on the surface of the sulfur-coated urea granule. The polymeric coating provides improved impact resistance of the composite coated granule.

8 Claims, 1 Drawing Sheet

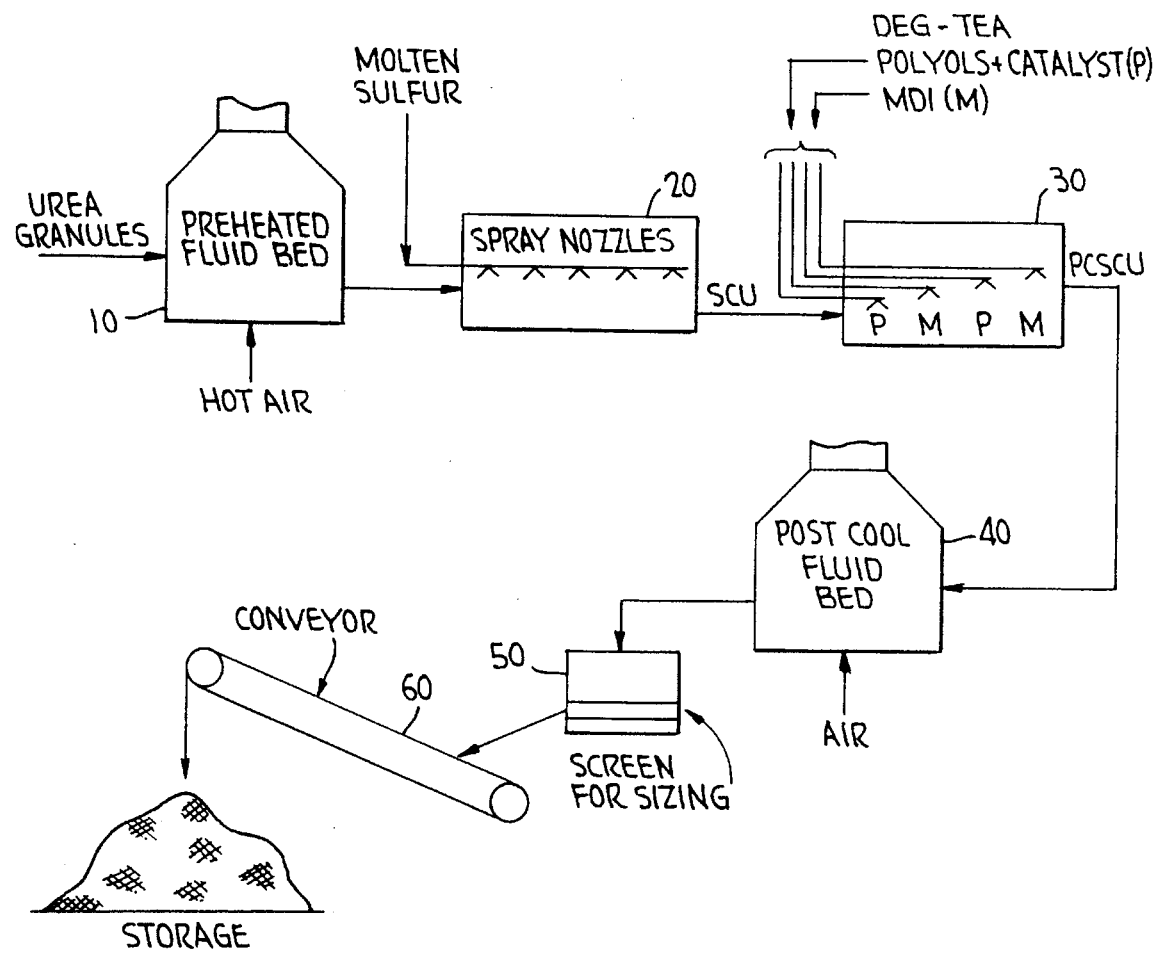

5,599,374

1

PROCESS FOR PRODUCING IMPROVED SULFUR-COATED UREA SLOW RELEASE FERTILIZERS

This invention is directed to an improved sulfur-coated urea fertilizer. More particularly, the invention is directed to an improved process for manufacturing sulfur-coated controlled release fertilizers by coating sulfur-coated urea with liquid monomers and polymerizing the monomers on the urea to provide a uniform coating having, inter alia, improved impact resistance. The specific monomers are diethylene glycol-triethanolamine polyols and a diisocyanate such as 4,4-diphenylmethane diisocyanate.

BACKGROUND OF THE INVENTION

Sulfur-coated urea (SCU) slow release fertilizers are known. In the customary process for the production of sulfur-coated urea, granular urea of nominal size range, 1.7–2.9 mm, which has been preheated in a fluid bed heater to 160° F. to 180° F., is introduced into the front end of a rotating horizontal cylindrical drum, nominally 12 feet in length and 5½ feet in diameter. Lifting flights, or longitudinal ledges, which are fastened to the inside wall of the drum and evenly spaced around its circumference, lift and cascade the urea granules as the drum rotates. As the cascading granules pass through the drum, molten (290° F.) sulfur is sprayed onto the urea granules from a series of nozzles uniformly positioned within the length of the drum. When a droplet of molten sulfur contacts a granule, it quickly solidifies; and a continuous coating of sulfur is formed on a urea granule when a sufficient number of molten sulfur droplets have made contact with it. In this randomized coating process the granules are coated to an average target thickness of 40 microns (μ) or about 13%–14% by weight sulfur-coating on the urea. However, various random proportions of the granules, which are discharging from the drum, have thin (<30μ), medium (30μ–50μ) and thick (>50μ) sulfur-coating thickness.

Because of the inherent brittleness of the crystalline solid sulfur-coating which forms on the granule, and the thin, or even noncontinuous coating on many of the granules, it is customary that some type of secondary outer coating or sealant be spray applied onto the sulfur-coating surface. Usually this is done in a second horizontal rotating drum in series with the sulfur-coating drum. Historically, this sealant has been either a polymeric hydrocarbon, petroleum-based wax, or a combination of high viscosity polymeric paraffinic oil plus polyethylene, which is spray applied as a hot melt liquid onto the hot, but solid sulfur-coating surface. Since the sealant melt will not solidify at the 160°–180° F temperature of the sulfur-coated urea granules onto which it is applied, the liquid sealant distributes relatively uniformly onto all sulfur-coated granules by flowing, or transferring, from one granule to the next as they cascade through the rotating secondary sealant coating drum. These sealant coated sulfur-coated urea granules pass through a fluid bed cooler, after they are discharged from the sealant drum, wherein the sealant solidifies to a firm, but somewhat tacky polymeric coating.

The characteristic tackiness, which is common to these types of sealants, is offset by the application of a powder material, often referred to as a conditioner, such as talc, clay, silica, or diatomaceous earth. This conditioner application usually is applied to the cooled, polymeric coated sulfur-coated urea (PCSCU) in a third rotary drum in series with the sulfur-coating and sealant coating drums. Products of the above type are described in U.S. Pat. Nos. 3,295,950; 3,342,577; 3,877,415; 3,903,333; 3,991,225 and 5,219,465.

Although these sulfur-coated urea products generally have good slow release characteristics as manufactured, the impact and abrasion resistance of the coating is low. Mechanical degradation of the coating occurs as a consequence of the handling, transportation, blending and application operations, which results in significant deterioration of slow release properties. Therefore, improved products still are desired.

SUMMARY OF INVENTION

The present invention provides a process for producing sulfur-coated slow release fertilizers which have improved properties. According to the process of this invention, the hot melt polymeric liquid sealant of the customary process is replaced by specific liquid monomers, which, when applied sequentially onto the surface of the hot sulfur-coated urea granules, copolymerize to form a firm, tack-free, water insoluble polymer coating sealant. This tack-free sealant process eliminates the need for a conditioner application. The liquid monomers are diisocyanates, such as MDI (4,4-diphenylmethane diisocyanate), and a polyol mixture of DEG (diethylene glycol) and TEA (triethanolamine). The TEA serves as both a reactive polyol and a catalyst.

It was discovered that, surprisingly, the DEG-TEA polyol when copolymerized with a diisocyanate gave significantly better results than the customary hot melt polymeric sealants, or other diisocyanate-polyol reaction polymers, such as described in U.S. Pat. No. 5,219,465 (Goertz et al), or lower molecular weight EG (ethylene glycol)-TEA polyol mixtures. The DEG:TEA mixture of polyols, which are premixed at ratios from 2.5:1.0 to 4.5:1.0, and preferably at a 3.5:1.0 ratio, are pumped from a hold tank through separate pumps to separate fixed application nozzle positions spaced uniformly through the length of the sealant drum. The number of nozzle positions is determined by the urea throughput rate and the percentage of reaction polymer sealant to be applied to the SCU. The MDI is pumped from a hold tank through separate pumps to fixed nozzle positions located next to each polyol nozzle position. Usually one nozzle set position is needed for up to each one percent of polymer applied to the sulfur-coated urea granule. The amount of liquid polyol(P) and MDI(M) which is pumped to each nozzle set position is in a stoichiometric ratio of (P):(M) which is consistent with optimum reaction polymerization to effect the polymer sealant characteristics that result in a tack-free, durable, impact resistant surface. This (P):(M) ratio falls within the range of 0.33:1 to 0.45:1 and preferably is 0.39:1.

It was discovered that the DEG polyol alone, or mixtures of the DEG polyol, at relatively high concentrations, with other higher equivalent weight polyols with each containing the stipulated TEA, gave significantly better quality performance than the customary hot melt polymeric sealants, or other MDI-polyol reaction polymers, such as described in the aforesaid Goertz '465 patent. Such comparisons are made at essentially equal sealant weight percentage and sulfur coating weight percentage, commonly 2% sealant and 13% sulfur coating on similarly sized granules.

THE DRAWINGS AND DETAILED DESCRIPTION OF INVENTION

A flow diagram of the process of the present invention is shown in the drawing. Referring to the drawing, urea granules having a nominal size range of 2.3 mm in a range of 1.7 to 2.9 mm are fed into a fluidized bed preheater 10 where the urea granules are heated with hot air. The preheated urea granules, at a temperature in the range of 160° to 180° F., then are fed into a rotating drum 20 where they are spray coated by a series of spray nozzles which are spraying molten sulfur at a temperature of approximately 280°–310° F., which is above sulfur solidification temperature of 235° F. The sulfur-coated urea granules then are transferred from drum 20 into a second rotating drum 30 containing a plurality of fixed nozzle set positions, which simultaneously coat the SCU granules with separately applied diethylene glycol-triethanolamine polyol and diisocyanate, such as MDI. The liquid DEG-TEA polyol mixture and the liquid diisocyanate intermix react and, or polymerize, on the surface of the sulfur-coated urea granules cascading within drum 30. After polymerization the now polymer coated sulfur-coated urea granules, at a temperature of about 170° F., are fed into a fluid bed cooler 40 and are cooled with cool air to a temperature in the range of 95° F. to 115° F. After cooling, the granules are fed through a screen 50 for sizing, and after being sized, are transferred by conveyor 60 to storage.

Preferred compositions of the reaction polymer coated SCU (PCSCU) products for the most common size granule used in commercial fertilizer blends for turfgrass applications, which is designated "regular size," nominally 2.4 mm in a size range from 1.7 mm to 3.0 mm, are given below:

TABLE 1

| Components | Percentage | |
|---|---|---|
| | A | B |
| Granular Urea (substrate) | 85.000 | 85.000 |
| Sulfur (coating) | 12.800 | 12.800 |
| Polyols(P) (reactant) | | |
| a.1 DEG (low E.W.) | .394 | .197 |
| a.2 Polyester polyol (high E.W.) | — | .421 |
| b. TEA | .112 | .102 |
| c. Pigment (optional) | .030 | .030 |
| MDI(M) (reactant) | 1.364 | 1.150 |
| Plasticizer (optional) | .300 | .300 |
| Total PCSCU Product | 100.000 | 100.000 |

As shown in Table 1, most preferred formulation A contains as the polyol a mixture of DEG and TEA, whereas, formulation B has part of the polyol mixture of formula A replaced with a high equivalent weight polyester polyol containing an appropriate level of TEA.

The ratio of polyol mixture (P) to the diisocyanate (M) and the ratio of DEG, or DEG plus polyester polyol, to the TEA catalyst polyol are shown in Table 2.

TABLE 2

| Ratios: | | A | B |
|---|---|---|---|
| a. | $\frac{P}{M}$ (reaction stoichiometry) | $\frac{0.393}{1.000}$ | $\frac{0.652}{1.000}$ |
| b. | $\frac{Polyols}{TEA}$ (mixtures) | $\frac{3.5}{1}$ | $\frac{6}{1}$ |

The improved impact resistance of the PCSCU product of this invention is measured by decreased percentage release of urea in: 1) a 2-hour 20° C. water immersion test of the PCSCU granules, which have been subjected to a 25 foot drop impact test, and 2) thereafter continuing the water immersion test described in 1) for a period of seven days at 30° C. In the following table this quality performance characteristic of the preferred formulation is compared with other process formulations of essentially the same sulfur and sealant weight percentage compositions:

TABLE 3

| Full Scale Plant Production Products Sulfur and Sealant at 13% and 2% | | |
|---|---|---|
| | Cumulative % Urea Released in Water Immersion (After 25 ft. Drop | |
| Sealant-Type (on SCU) | 2 hrs at 20° C. | 7 Days at 30° C. |
| MDI & DEG/TEA Reaction Polymer | 6 | 38 |
| Polymeric Wax (with conditioner) | 24 | 61 |
| Solvent Dispersed Polymer | 28 | 66 |

As apparent from Table 3, the sealant of the present invention provides a substantial improvement over either a polymeric wax sealant or a solvent dispersed sealant. It is believed that this improved impact resistance is, apparently, because the uniquely small molecular size and shape of the DEG and TEA molecules, coupled with their high functionality, when reacted in the aforementioned balance with high functionality MDI, produce a highly crosslinked, rigid polyurethane sealant coating with high impact strength and surface hardness properties. Particularly, the TEA, a three-functional, amine based self-catalytic polyol, when properly balanced with the DEG, yields this extraordinary result when polymerized with the MDI.

Further, the polymerization reaction among the polyol and MDI monomers ostensibly delays sufficiently to facilitate the flow of these unreacted liquids over the sulfur-coated granules. This flow of liquids onto all the granules cascading in the rotating drum provides the intimate contact and mixing among monomer reactants, which is necessary for the designed stoichiometric polymerization to occur that results in an impact resistant polymer sealant. Moreover, this reaction delay allows the liquids to spread to a uniform polymer sealant thickness among all the granules, irrespective of the thickness of the sulfur coating on any granule; and, therefore, all sulfur-coated granules have a protective polymer sealant on their surface.

It will be apparent to one skilled in the art that various modifications can be made to the sulfur-coated urea fertilizers within the scope of the aforesaid description. Such modifications being within the ability of one skilled in the art form a part of the present invention and are embraced by the appended claims.

It is claimed:

1. A process for the preparation of sulfur-coated urea granular fertilizer products comprising the steps of 1) coating preheated urea granules with molten sulfur to obtain a coating having a predetermined nominal thickness within a range of thicknesses;

2) coating the sulfur-coated urea granules of step 1 with reactive monomers and polymerizing said monomers on the surface of the sulfur-coated urea granules to form an impact resistant polymer sealant coating, said monomers being a diisocyanate and a polyol mixture of diethylene glycol and triethanolamine; and 3) cooling the polymer coated sulfur-coated urea granules product of step 2.

2. The process of claim 1 wherein the diisocyanate is comprised primarily of 4,4-diphenylmethane diisocyanate.

3. The process of claim 1 wherein a portion of the diethylene glycol-triethanolamine polymer mixture is replaced with a high molecular weight polyester polyol.

4. The process of claim 4 wherein the weight ratio of diethylene glycol and triethanolamine is from 2.5:1 to 4.5:1.

5. The process of claim 4 wherein the weight ratio of diethylene glycol-triethanolamine is 3.5:1.

6. The process of claim 4 wherein the weight ratio of liquid polyol to diisocyanate is within the range of 0.33:1 to 0.45:1.

7. The process of claim 6 wherein the ratio of polyol to diisocyanate is 0.39:1.

8. The sulfur-coated urea granular fertilizer produced by the process of claim 1, 2, 3, 4, 5, 6, or 7.

* * * * *

UNITED STATES PATENT AND TRADEMARK OFFICE
CERTIFICATE OF CORRECTION

PATENT NO. : 5,599,374
DATED : February 4, 1997
INVENTOR(S) : John H. Detrick

It is certified that error appears in the above-indentified patent and that said Letters Patent is hereby corrected as shown below:

Claim 4, column 5, line 6, "The process of claim 4" should read -- The process of claim 3 --.

Signed and Sealed this

Twenty-fifth Day of November, 1997

Attest:

BRUCE LEHMAN

Attesting Officer     Commissioner of Patents and Trademarks